United States Patent [19]

Chattin

[11] Patent Number: 4,519,271
[45] Date of Patent: May 28, 1985

[54] PEDAL TELESCOPING DEVICE

[76] Inventor: Jesse Chattin, 7201 S. 49th Ave., Tampa, Fla. 33619

[21] Appl. No.: 367,029

[22] Filed: Apr. 9, 1982

[51] Int. Cl.³ .............................................. G05G 1/14
[52] U.S. Cl. .................................................. 74/594.3
[58] Field of Search ...................... 74/594.3, 601, 602

[56] References Cited

U.S. PATENT DOCUMENTS

| 516,137 | 3/1894 | Tyler | 74/594.3 |
| 550,206 | 11/1895 | Tompkins | 74/594.3 |
| 571,793 | 11/1896 | Rau | 74/594.3 |
| 623,863 | 4/1899 | Atterbury | 74/594.3 |
| 641,728 | 1/1900 | Robinson | 74/594.3 |
| 653,873 | 7/1900 | Malone | 74/594.3 |
| 669,542 | 3/1901 | Moore | 74/594.3 |
| 676,629 | 6/1901 | Moore | 74/594.3 |
| 1,636,327 | 7/1927 | Roe | 474/144 |

FOREIGN PATENT DOCUMENTS

| 413160 | 3/1946 | Italy | 74/594.3 |
| 500983 | 11/1954 | Italy | 74/594.3 |
| 611342 | 10/1960 | Italy | 74/594.3 |

Primary Examiner—Kenneth J. Dorner
Attorney, Agent, or Firm—Frijouf, Rust & Pyle

[57] ABSTRACT

An apparatus for changing the leverage of an existing pedal assembly by telescoping the pedal of the pedal assembly during rotation of the pedal about the pedal assembly axle comprising a housing having an axle shaft rotatably disposed therein, a cam plate operatively mounted on the axle shaft being stationary with respect to the housing, a cam ring radially spaced from the cam plate by a ring bearing disposed therebetween, a pedal arm attached to the axle shaft, a telescoping pedal guide movably mounted on the pedal arm wherein the pedal guide includes a lead bolt attached thereto and a sprocket operatively interconnected to the pedal to rotate therewith in relationship to the axle shaft the lead bolt being slidably disposed on the periphery of the cam plate wherein the cam plate and cam ring control the movement of the lead bolt thus controlling the telescoping motion of the pedal guide as the pedal arm and pedal guide rotate with the axle shaft.

6 Claims, 4 Drawing Figures

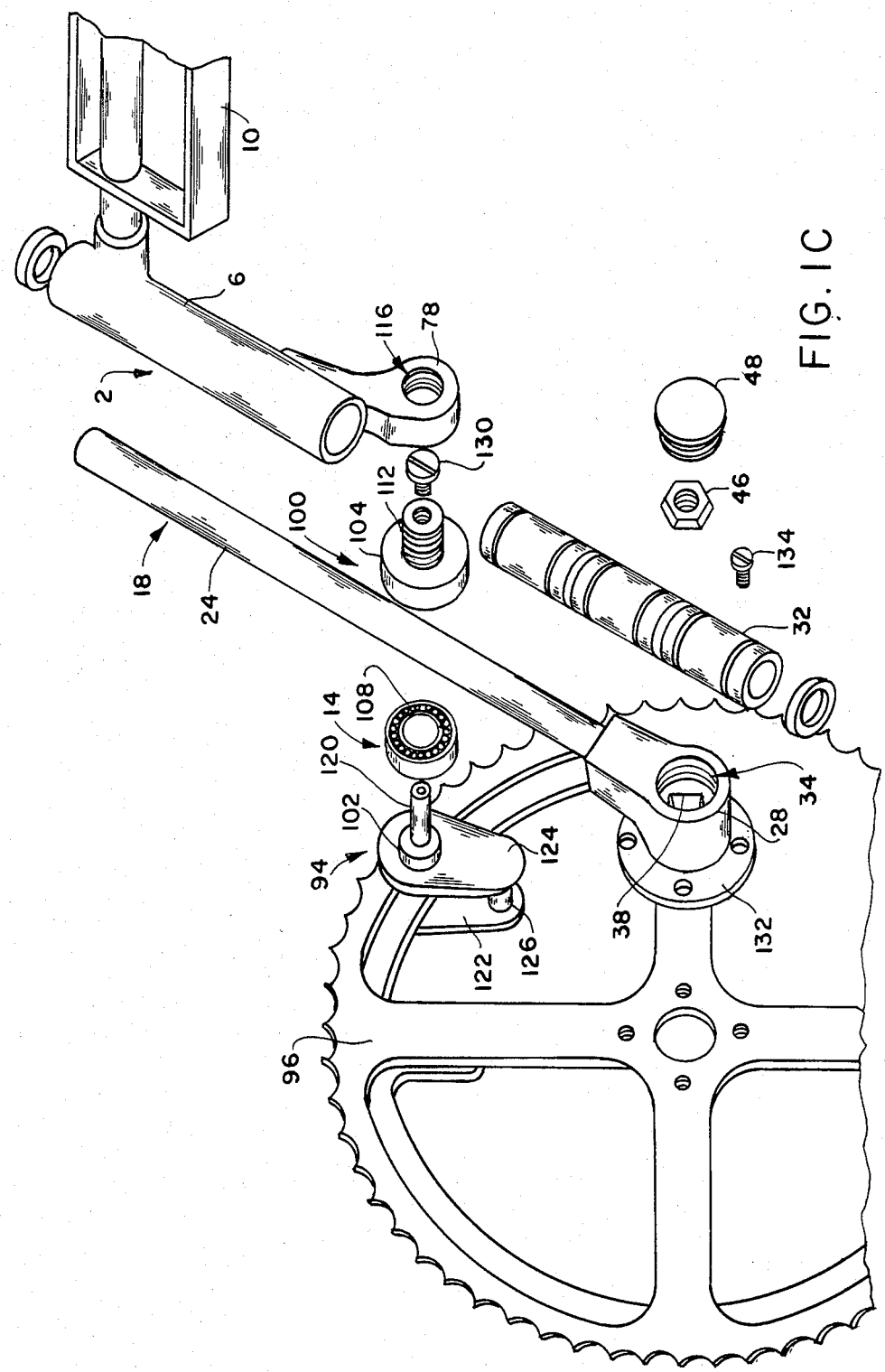
FIG. IC

PEDAL TELESCOPING DEVICE

BACKGROUND OF THE INVENTION

1. Field of the Invention

An apparatus for changing the leverage of an existing pedal assembly by telescoping the pedal of the pedal assembly during rotation of the pedal around the pedal assembly axle.

2. Description of the Prior Art

Numerous attempts have previously been made to increase the efficiency of a bicycle through the use of a telescoping pedal. Generally speaking, however, these attempts have not been as successful as desired primarily because of the many frictional problems contained therein. One of the major frictional problems that frustrated those responsible for the prior art attempts is the friction present between a cam element and an element that interfaces with the cam, i.e., the element that runs in the track of the cam. In addition, there is the problem of the friction caused by the linear sliding motion between the element of which the pedal is a part and the element that is connected to the end of the pedal axle and rotates with the axle, i.e., the pedal arm.

Exemplary of the above-described prior art are the following U.S. Pat.: Nos. 516,137; 623,863; 550,206; 653,873; 571,793; and 676,629.

None of these prior art patents disclose apparatus able to adequately solve the above-described friction problems.

From the above, it is apparent that there exists a need in the art for an improved pedal telescoping apparatus thereby to increase the effectiveness of the pedalling operation of a bicycle. It is the purpose of this invention to fulfill this and other needs apparent to the skilled artisan once given the following disclosure.

SUMMARY OF THE INVENTION

This invention provides for an effective means of increasing the efficiency of a bicycle pedal assembly and converting human energy into a driving force on the bicycle's chain. This is accomplished by attaching the pedal to a pedal guide that telescopes on a pedal arm as the pedal arm rotates with the axle shaft. The motion of the pedal guide is controlled by a cam ring and a cam plate. The pedal guide is attached to the cam ring which rotates about the cam plate. This serves to change the leverage of the arm of the pedal with respect to the axle shaft as the pedal arm rotates, so that the pedal's maximum leverage is obtained when it will most effectively translate the human energy into a driving force on the bicycle chain.

More specifically, the pedal guides each comprise corresponding hollow cylinders, pedals, and first and second lead bolt assemblies. The pedals are affixed to the outer end of hollow cylinders opposite from the first and second lead bolt assemblies.

The pedal arms comprise corresponding rods and axle end housing.

The axle end housings each includes a corresponding recess in combination with corresponding square aperture toreceive the outer portions of axle shaft which comprise substantially square outer extension to seat within the square apertures and threaded portion extending outwardly therefrom to receive nuts thereon. Substantially flat cam plates comprise corresponding offset apertures respectively to receive the axle shaft therethrough. The cam plates remain stationary with respect to the other non-rotating elements of the apparatus as the axle shaft rotates. The cam plates have peripherally located thereon ring bearings and cam rings. The ring bearings are located or operatively disposed between corresponding cam plates to remain stationary with respect to the spindle housing while the corresponding cam rings rotate with the first and second lead bolt assemblies. The cam rings thus rotate because they are operatively coupled to the corresponding first and second lead bolt assemblies which rotate with corresponding pedal arms as they rotate as the bicycle is operated.

The outer end of the first and second lead bolt assemblies are threaded to screw into the threaded apertures formed in corresponding guide rod holders. The guide rod holders are disposed at substantially right angles with corresponding pedals near the opposite ends of the corresponding pedal guides. The guide rod plug assembly comprises a guide rod plug housing and a threaded extension to engage and couple to internally threaded nut formed on the cam ring. The guide rod plug housing radially surrounds the guide bearing and ball bushing.

In contrast to applicant's earlier invention, the present invention is specifically configured and designed to provide modification of existing bicycle assemblies. More particularly, first lead bolt assembly includes a substantially U-shaped bridge coupling configured to bridge chain sprocket. The first lead bolt assembly includes an inner and outer guide rod plug assembly. The inner and outer guide rod plug assemblies include inner and outer guide rod plugs, each including recesses to receive corresponding inner and outer guide bearings. The inner and outer guide rod plug assemblies further include an externally threaded extension respectively to be received by internally threaded apertures formed in cam ring and guide rod holder. This first lead bolt assembly further comprises an inner and outer lead bolt element coaxially aligned attached to opposite sides of parallel elements bridging the chain sprocket by an interconnecting element. The inner and outer lead bolt elements are affixed to the cam ring and guide rod holder respectively by means of fastening means. Thus the first and second lead bolt assemblies permitted to function similarly.

In summary, the inner and outer lead bolt elements of the first lead bolt assembly rotate about the axle shaft with the pedal guide and rod are being free to rotate within the inner and outer guide rod plug assemblies. The lead bolt element of the second lead bolt assembly is affixed to pedal guide and free torotate within guide rod plug housing during rotation of the pedal guide rod with rotation of axle shaft.

The chain sprocket is affixedly attached to the pedal arm by means of a coupling flange and fastening means.

Since the devices in which the subject apparatus may be used are conventional, the devices are not shown. It is understood, however, that the subject apparatus can be used on all bicycles or other devices which use pedal power to rotate a chain sprocket or the like and drive a chain or other power take-off attached thereto. The chain sprocket illustrated is, thus, generic to these types of devices, conventional bicycles being one preferred environment for this invention. The disclosed apparatus is to be installed on an existing bicycle frame or other frame work may be necessary in order to make the installation.

The operation of the subject apparatus is best understood with reference to a conventional bicycle. As one is riding a bicycle employing the subject apparatus, the pedals of the bicycle, pedal guides, and pedal arms rotate with the axle shaft. The first and second lead bolt assemblies which are coupled to the pedal guides respectively likewise roate with the axle shaft. The first and second lead bolt assemblies are attached to the cam rings as previously described thus causing the cam rings to rotate about the corresponding cam plates which are stationary with respect to the other non-rotating elements of the bicycle. As the cam rings so rotate, the distance between the first and second lead bolt assemblies and the central axis of the axle shaft as well as the distance between the pedals and the axle shaft varies due to the fact that the cam plates control the movement of the first and second lead bolt assemblies.

Thus, the pedal arms move in a true circle with respect to the axle shaft acts as the center of the shaft, while the pedal guides, pedals, and first and second lead bolt assemblies are moved in an elliptical eccentric motion about the axle shaft because the motion of the first and second lead bolt assemblies is controlled by the cam plates respectively. This creates a linear motion between the pedal arms and pedal guides of which the first and second lead bolt assemblies are elements, which results in the telescoping movement of the pedals with respect to the axle shaft.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIGS. 1A, 1B and 1C are a continuation exploded view of one embodiment of this invention.

Similar reference characters refer to similar parts throughout the several views of the drawings.

DETAILED DESCRIPTION OF THE PREFERRED EMBODIMENT

Figure 1A:
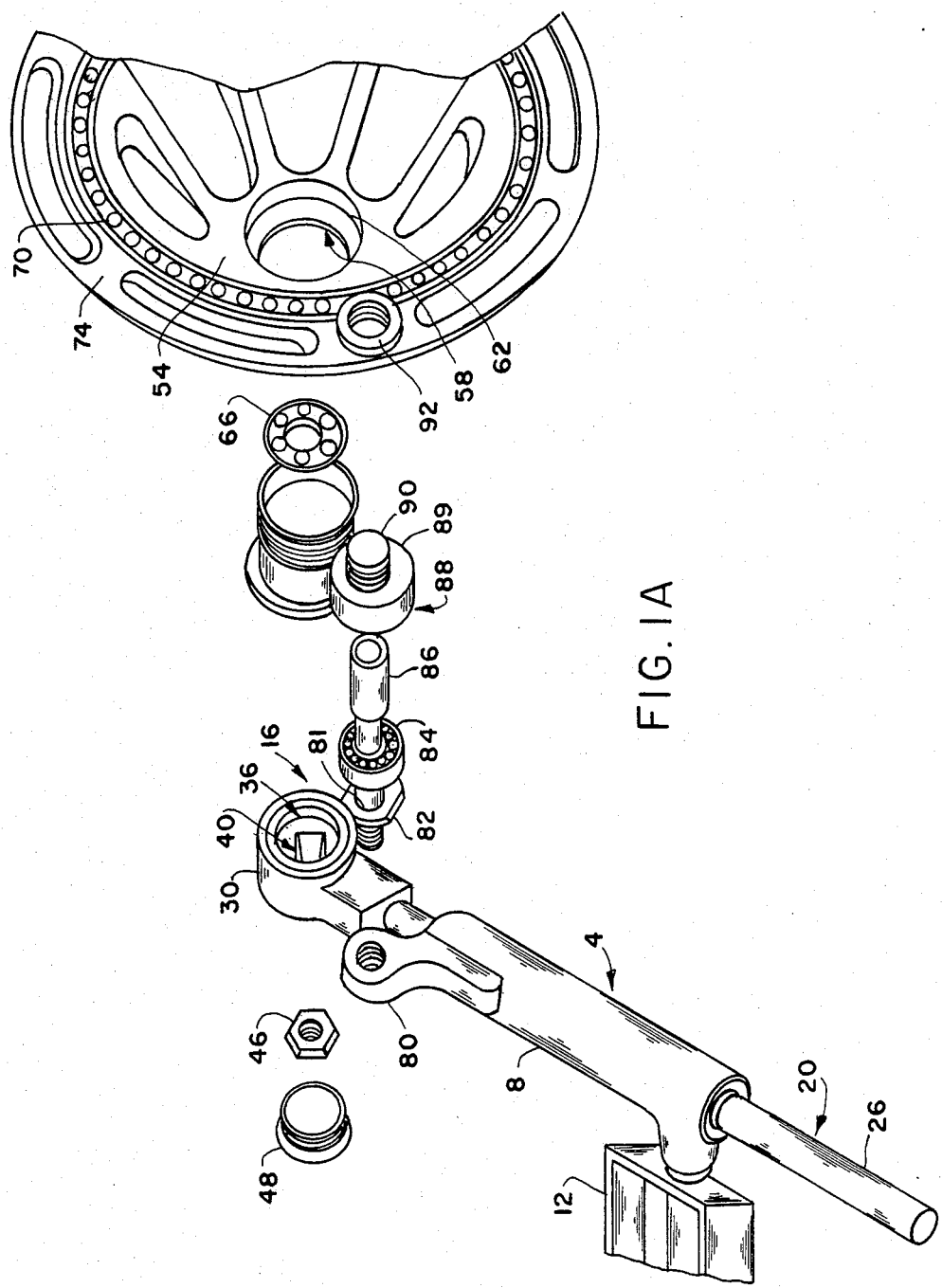
Figure 1B:
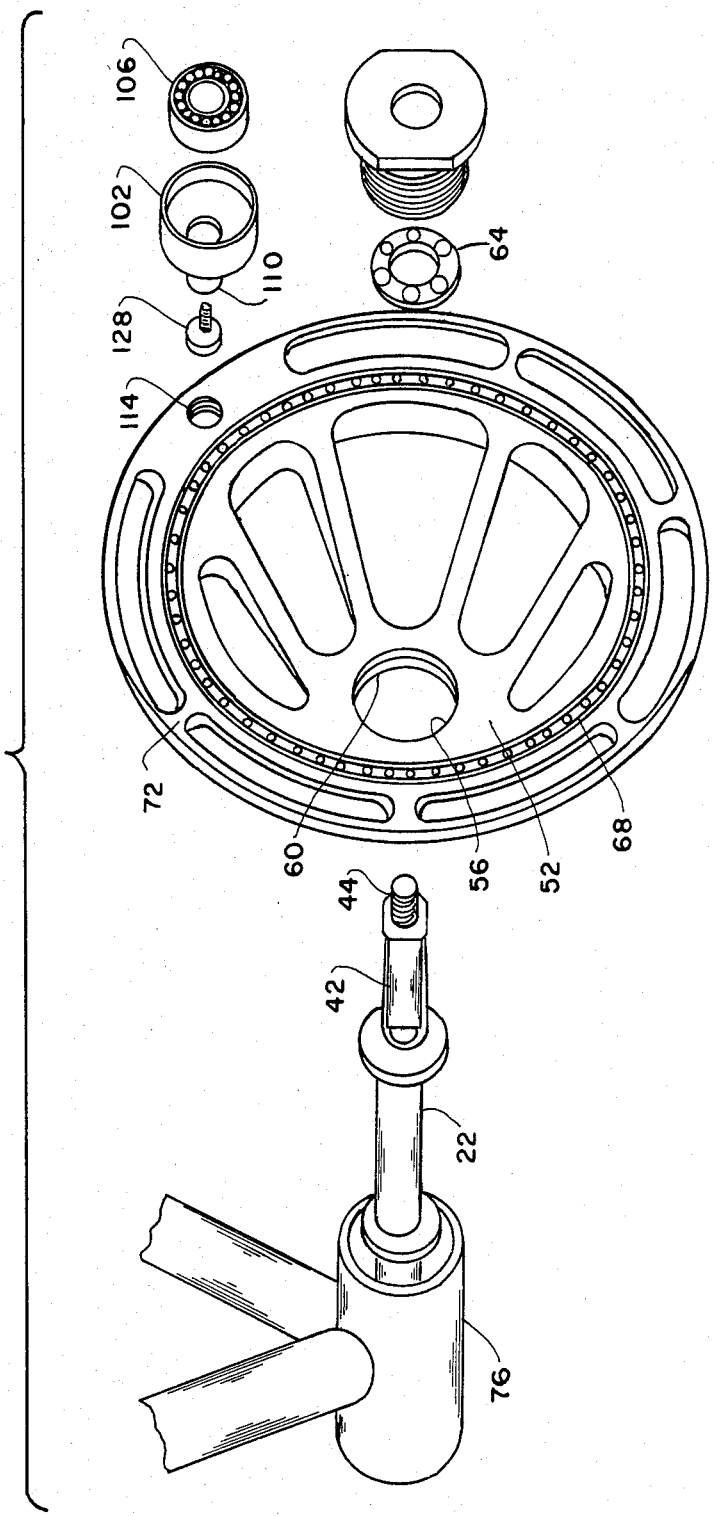
Figure 2:
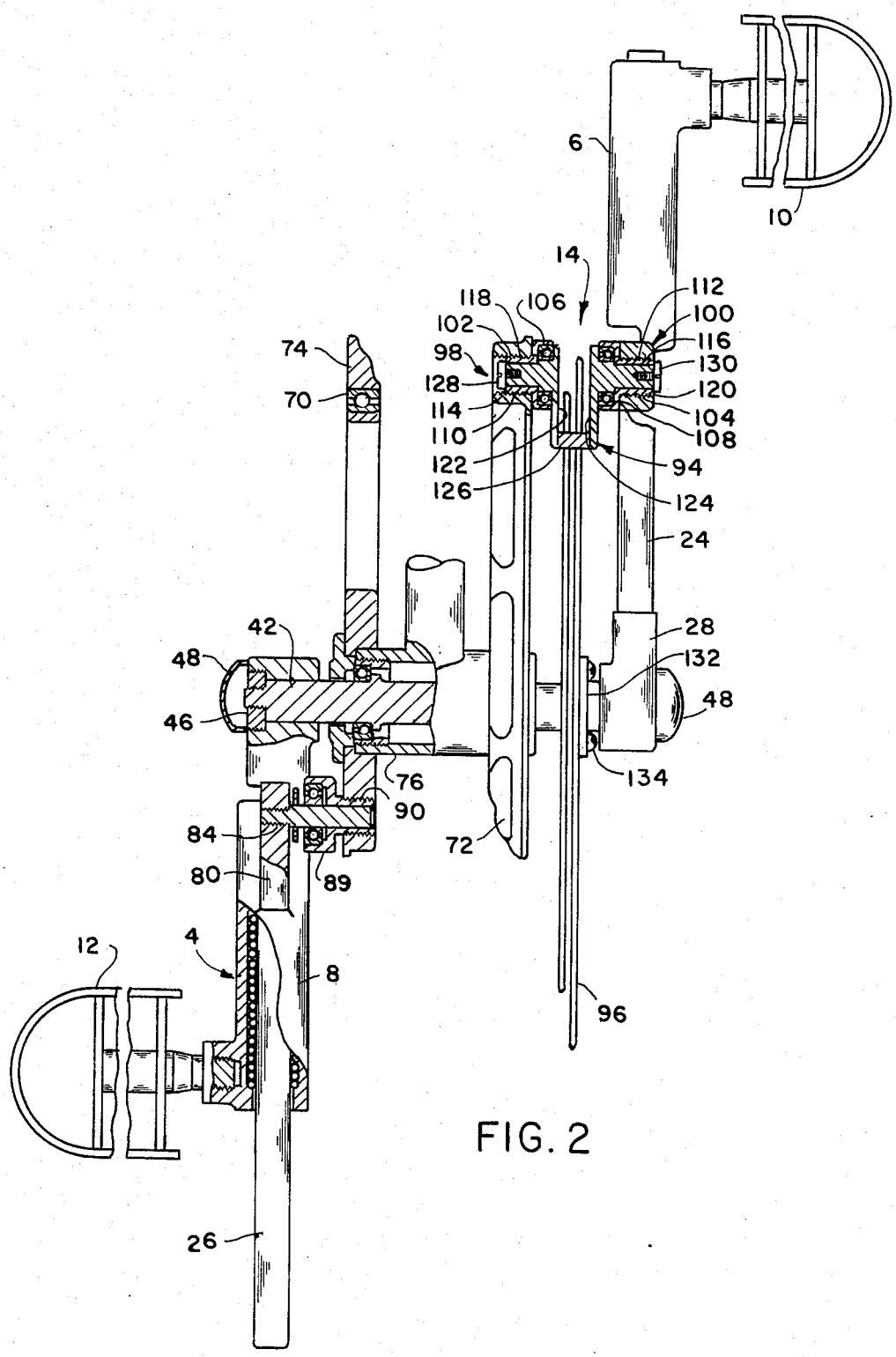
FIG. 2 is a top plane view, partially sectionalized, of the embodiment illustrated in FIGS. 1A, 1B and 1C.

As more fully described hereinafter with reference to the drawings, this invention provides for an effective means of increasing the efficiency of a bicycle pedal assembly and converting human energy into a driving force on the bicycle's chain. This is accomplished by attaching the pedal to a pedal guide that telescopes on a pedal arm as the pedal arm rotates with the axle shaft. The motion of the pedal guide is controlled by a cam ring and a cam plate. The pedal guide is attached to the cam ring which rotates about the cam plate. This serves to change the leverage of the arm of the pedal with respect to the axle shaft as the pedal arm rotates, so that the pedal's maximum leverage is obtained when it will most effectively translate the human energy into a driving force on the bicycle chain.

More specifically, pedal guides generally indicated as 2 and 4 each of which comprise corresponding hollow cylinders or pedal guides 6 and 8, pedals 10 and 12, and first and second lead bolt assemblies 14 and 16 respectively. The pedals 10 and 12 are affixed to the outer end of hollow cylinders 6 and 8 respectively opposite from the first and second lead bolt assemblies 14 and 16 respectively. The interior diameter of the hollow cylinders 6 and 8 are greater than the exterior diameter of the corresponding pedal arms 18 and 20 respectively. This enables the pedal guides 2 and 4 to be easily slipped off the corresponding pedal arms 18 and 20 respectively after disconnecting the the first and second lead bolt assemblies 14 and 16 respectively from the remainder of the bicycle assembly. Thus the linear motion of the pedal guides 2 and 4 along the corresponding pedal arms 18 and 20 is not restricted enabling the pedal guides 2 and 4 to telescope on the corresponding pedal arms 18 and 20 respectively with respect to the axle shaft 22.

The pedal arms 18 and 20 comprise corresponding rods 24 and 26 respectively and corresponding axle end housings 28 and 30 respectively. Ball bushings 32 are placed on rods 24 and 26 to reduce the friction between the pedal guides 2 and 4 with respect to the corresponding pedal arms 18 and 20 respectively as the apparatus is operated.

The axle end housings 28 and 30 each includes a corresponding recess 34 and 36 respectively in combination with corresponding square aperture 38 and 40 respectively to receive the outer portions of axle shaft 22 which comprise substantially square outer extension 42 to seat within the square apertures 38 and 40 and threaded portion 44 extending outwardly therefrom to receive nuts 46 thereon. Axle plugs 48 are press fitted over nuts 46 to axle end housings 28 and 30 to protect the assembly from dirt, water, grime and the like. Substantially flat cam plates 52 and 54 comprise corresponding offset apertures 56 and 58 respectively to receive the axle shaft 22 therethrough. Correspond cam bearing surfaces 60 and 62 respectively receive corresponding cam plate ball bushings 64 and 66 respectively. Thus the cam plates 52 and 54 remain stationary with respect to the other non-rotating elements of the apparatus as the axle shaft 22 rotates. The cam bearing surfaces 60 and 62 have an outer edge the protrudes from the corresponding apertures 56 and 58 in which the corresponding cam plates ball bushings 64 and 66 are received to retain the cam ball bushings 64 and 66 therein. The cam plates 52 and 54 have peripherally located thereon corresponding ring bearings 68 and 70 and corresponding cam rings 72 and 74 respectively. Corresponding ring bearings 68 and 70 are located or operatively disposed between corresponding cam plates 52 and 54 to remain stationary with respect to the spindle housing 76 while the corresponding cam rings 72 and 74 rotate with the first and second lead bolt assemblies 14 and 16 respectively. The cam rings 72 and 74 thus rotate because they are operatively coupled to the corresponding first and second lead bolt assemblies 14 and 16 which rotate with corresponding pedal arms 18 and 20 as they rotate as the bicycle is operated.

As previously suggested the first and second lead bolt assemblies 14 and 16 are removably attached to corresponding pedal guides 2 and 4 respectively. The outer end of the first and second lead bolt assemblies 14 and 16 are threaded to screw into the threaded apertures formed in corresponding guide rod holders 78 and 80. The guide rod holders 78 and 80 are disposed at substantially right angles with corresponding pedals 10 and 12 near the opposite ends of the corresponding pedal guides 2 and 4. The second lead bolt assembly 16 further includes a lead bolt element 81 having washer 82 disposed between the guide rod holder 80 and bearing guide 84. A ball bushing 86 is disposed on lead bolt element 81 to insure that the lead bolt element 81 easily rotates with respect to the guide rod plug, assembly generally designated 88. The guide rod plug assembly 88 comprises a guide rod plug housing 89 and a threaded extension 90 to engage and couple to internally threaded nut 92 formed on the cam ring 74. The guide rod plug housing 89 radially surrounds the guide bearing 84 and ball bushing 86.

In contrast to applicant's earlier invention, the present invention is specifically configured and designed to provide modification of existing bicycle assemblies. More particularly, first lead bolt assembly 14 includes a substantially U-shaped bridge coupling generally indicated as 94 configured to bridge chain sprocket or drive means 96. The first lead bolt assembly 14 includes an inner and outer guide rod plug assembly generally indicated as 98 and 100 respectively. The inner and outer guide rod plug assemblies 98 and 100 include inner and outer guide rod plugs 102 and 104, each including recesses to receive corresponding inner and outer guide bearings 106 and 108 respectively. The inner and outer guide rod plug assemblies 98 and 100 further include an externally threaded extension 110 and 112 respectively to be received by internally threaded apertures 114 and 116 formed in cam ring 72 and guide rod holder 78 respectively. The first lead bolt assembly 14 further comprises an inner and outer lead bolt element 118 and 120 coaxially aligned attached to opposite sides of parallel elements 122 and 124 bridging the chain sprocket 96 by interconnecting element 126. The inner and outer lead bolt elements 118 and 120 are affixed to the cam ring 72 and guide rod holder 78 respectively by means of fastening means or screws 128 and 130 respectively. Thus the first and second lead bolt assemblies 14 and 16 are permitted to function similarly.

In summary, the inner and outer lead bolt elements 118 and 120 of the first lead bolt assembly 14 rotate about the axle shaft 22 with the pedal guide 2 and rod 24 are being free to rotate within the inner and outer guide rod plug assemblies 98 and 100. The lead bolt element 81 of the second lead bolt assembly 16 is affixed to pedal guide 4 and free to rotate within guide rod plug housing 89 during rotation of the pedal guide 4 rod 26 with rotation of axle shaft 22.

The chain sprocket 96 is affixedly attached to the pedal arm 18 by means of a coupling flange 132 and fastening means or screws 134.

Since the devices in which the subject apparatus may be used are conventional, the devices are not shown. It is understood, however, that the subject apparatus can be used on all bicycles or other devices which use pedal power to rotate a chain sprocket or the like and drive a chain or other power take-off attached thereto. The chain sprocket illustrated is, thus, generic to these types of devices, conventional bicycles being one preferred environment for this invention. The disclosed apparatus is to be installed on an existing bicycle or other device, modification of the bicycle frame or other frame work may be necessary in order to make the installation.

The operation of the subject apparatus is best understood with reference to a conventional bicycle. As one is riding a bicycle employing the subject apparatus, the pedals 10 and 12 of the bicycle, pedal guides 2 and 4, and pedal arms 18 and 20 rotate with the axle shaft 22. The first and second lead bolt assemblies 14 and 16 which are coupled to the pedal guides 2 and 4 respectively likewise rotate with the axle shaft 22. The first and second lead bolt assemblies 14 and 16 are attached to the cam rings 72 and 74 as previously described thus causing the cam rings 72 and 74 to rotate about the corresponding cam plates 52 and 54 which are stationary with respect to the other non-rotating elements of the bicycle. As the cam rings 72 and 74 so rotate, the distance between the first and second lead bolt assemblies 14 and 16 and the central axis of the axle shaft 22 as well as the distance between the pedals 10 and 12 and the axle shaft 22 varies due to the fact that the cam plates 52 and 54 control the movement of the first and second lead bolt assemblies 14 and 16 respectively.

Thus, the pedal arms 18 and 20 move in a true circle with respect to the axle shaft 22 acts as the center of the shaft, while the pedal guides 2 and 4, pedals 10 and 12, and first and second lead bolt assemblies 14 and 16 are moved in an elliptical eccentric motion about the axle shaft 22 because the motion of the first and second lead bolt assemblies 14 and 16 is controlled by the cam plates 52 and 54 respectively. This creates a linear motion between the pedal arms 18 and 20 and pedal guides 2 and 4 respectively of which the first and second lead bolt assemblies 14 and 16 are elements, which results in the telescoping movement of the pedals 10 and 12 with respect to the axle shaft 22.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention heein described, and all statements of the scope of the invention which as a matter of language, might be said to fall therebetween.

Now that the invention has been described, what is claimed is:

1. An apparatus for telescoping a pedal of a pedal assembly between a retracted and extended position, said apparatus comprising:
   a spindle housing having an axle shaft rotatable disposed therein;
   a cam plate mounted on said axle shaft such that said cam plate is stationary relative said to housing;
   a cam ring radially spaced from said cam plate by a ring bearing disposed circumferentially between said cam plate and said ring bearing;
   a pedal arm attached to said shaft;
   a pedal guide slidably mounted on said pedal arm, the pedal being attached to said pedal guide;
   a first lead bolt assembly attached to said pedal guide for interconnecting said pedal guide to said cam ring;
   a chain sprocket attached to said axle shaft to rotate with said axle shaft, said chain sprocket being disposed between said pedal arm and said cam ring;
   said first lead bolt assembly further including:
     an inner lead bolt element rotatably secured to said cam ring;
     an outer lead bolt element rotatably secured to said pedal guide; and
     a bridge coupling extending through said chain sprocket and between said inner and outer lead bolt elements for coupling said cam ring and said pedal guide together for moving the pedal between the retracted and the extended positions.

2. The apparatus of claim 1 wherein said bridge coupling is a U-shaped coupling comprising a pair of substantially parallel elements and an interconnecting element for interconnecting said cam ring and said pedal arm.

3. The apparatus of claim 1 further comprising a second lead bolt assembly in combination with a second cam ring and second cam ring plate on the opposite side of said housing from said first lead bolt assembly.

4. The apparatus of claim 3 wherein said second lead bolt assembly comprises a lead bolt element and guide rod plug assembly comprising a guide rod plug housing to receive a portion of said lead bolt element, said lead bolt element of said second lead bolt assembly being rotatable relative to said guide rod plug housing of said second lead bolt assembly.

5. The apparatus of claim 1 further comprising pedal guide further comprising a guide rod holder coupled to said first lead bolt assembly such that said inner lead bolt element is disposed forwardly of said pedal arm in direction of rotation of said pedal arm.

6. An apparatus for telescoping a pedal of a pedal assembly between a retracted and extended position during rotation of the pedal, said apparatus comprising a housing having an axle shaft rotatably disposed therein, a cam plate mounted on said axle shaft such that said cam plate is stationary relative said to housing, a cam ring radially spaced from said cam plate by a ring bearing disposed circumferentially therebetween, a pedal arm attached to said shaft, a pedal guide slidably mounted on said pedal arm, the pedal being attached to said pedal guide, a first lead bolt assembly attached to said pedal guide to interconnect said pedal guide to said cam ring, and a drive means attached to said axle shaft to rotate with said axle shaft, said first lead bolt assembly comprising an inner and outer lead bolt element attached to opposite sides of a bridge coupling and an inner and outer guide rod plug assembly to cooperatively receive said inner and outer lead bolt elements respectively, said inner and outer guide rod plug assemblies each comprising a guide rod plug having recesses formed therein to receive corresponding inner and outer guide bearings to permit rotation of said inner and outer lead bolt elements with respect to said cam ring and said pedal guide, said first lead bolt assembly being rotatably coupled to said cam ring such that as said pedal arm, said pedal guide and pedal rotate around said axle shaft, said cam ring controls the movement of said lead bolt to move the pedal and said pedal guide between said retracted and extended position.

* * * * *